April 20, 1943.  H. G. DOLL  2,317,259
DEVICE FOR DETERMINING THE STRATA TRAVERSED BY DRILL HOLES
Filed Feb. 15, 1938
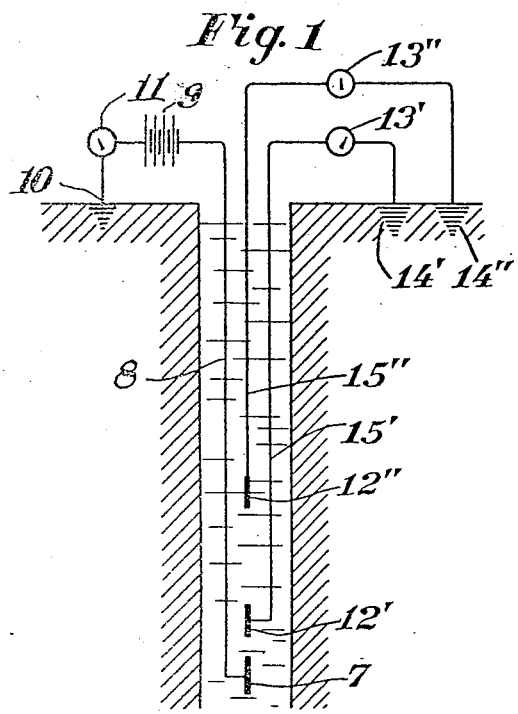
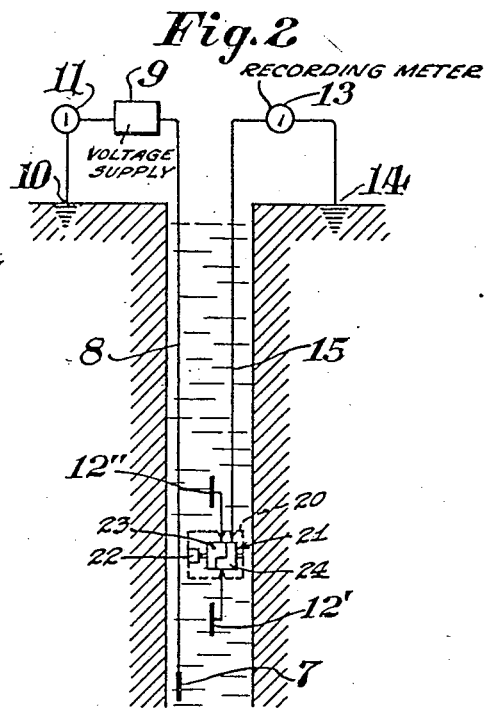
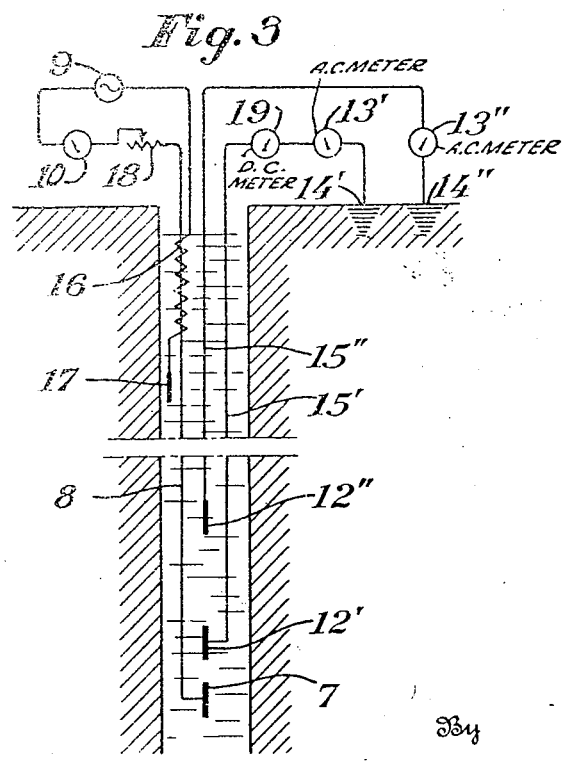
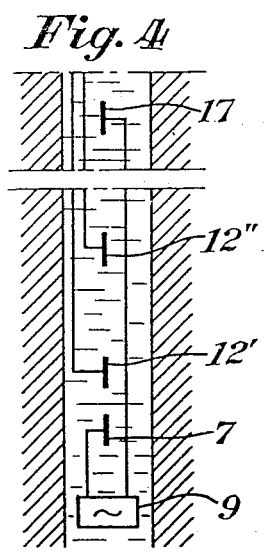
Inventor
Henri Georges Doll
By Mauro & Lewis
Attorneys Patented Apr. 20, 1943

2,317,259

UNITED STATES PATENT OFFICE 2,317,259

DEVICE FOR DETERMINING THE STRATA TRAVERSED BY DRILL HOLES

Henri Georges Doll, Paris, France, assignor, by mesne assignments, to Schlumberger Well Surveying Corporation, Houston, Tex., a corporation of Delaware Application February 15, 1938, Serial No. 190,652

8 Claims. (Cl. 175—182)

The present invention relates to electrical methods and apparatus for determining the nature of the geological strata traversed by a bore hole. More specifically it relates to a new and improved method and apparatus for obtaining indications of an electrical characteristic of the strata surrounding a bore hole containing a column of liquid, with greater accuracy than has been possible heretofore.

It is a well known fact that the nature of formations traversed by a bore hole may be ascertained by obtaining indications of their relative electrical properties. Methods and apparatuses for this purpose are disclosed in prior Patents Nos. 1,819,923 and 1,894,328, in which indications of the electrical resistivity of the formations are obtained by passing current from an electrode into the formations and measuring with a potential electrode, or electrodes, the potential differences created in the formations by the passage of current therethrough.

In prior art methods of this character, the resistivity indications obtained are those of the formations in a zone spaced from the current electrode a distance approximately equal to the spacing between the current electrode and the potential electrode or electrodes. In order to obtain very accurate measurements, it has been found preferable to make this distance less than the width of the formation being investigated. Hence, where it is desired to ascertain the nature of thin layers, it has been the practice to keep the distance between the current electrode and the potential electrode or electrodes relatively small.

Where this is done, however, the indications obtained of the nature of permeable strata do not have a high degree of accuracy, although in most cases they are adequate for all practical purposes. This results from the fact that the liquid contained in the bore hole, which is generally at a higher pressure than the fluid imbibing the permeable strata, tends to penetrate some distance into the strata, thereby changing its electrical characteristics to some extent.

It is an object of the invention, accordingly, to provide an improved method and apparatus in which current is passed from an electrode into the formations, and potential measurements are made at several points, spaced from the current electrode, and located in the path of the current, whereby indications of the resistivity of the formations may be obtained at least two different depths of investigation.

A further object of the invention is to provide an improved method and apparatus for ascertaining the nature of the formations traversed by a bore hole in which indications of the resistivity of a formation are obtained at at least two different depths of investigation, simultaneously with indications of the spontaneous potentials existing in the bore hole.

In a preferred embodiment of the invention, an electrical current is passed into the formations between a power electrode lowered into the bore hole, and another electrode located a considerable distance from the power electrode. Indications are then obtained simultaneously of the respective potential differences between a grounded reference electrode and several potential electrodes located at different distances from the power electrode, and lying in the current path.

Where it is desired to obtain indications of spontaneous potentials simultaneously with the indications of resistivity, a variable current is preferably used, such as, for example, alternating current, in which case the resistivity potential differences may be measured by devices responsive only to alternating current. Indications of the spontaneous potential differences existing in the bore hole may be obtained by connecting a direct current potential measuring instrument in the circuit of one of the potential electrodes.

The invention may be better understood from the following detailed description taken in connection with the accompanying drawing, in which Figure 1 is a schematic diagram of apparatus constructed in accordance with the invention for obtaining resistivity indications at two different depths of investigation;

Figure 2 is a modified form of the apparatus shown in Figure 1 in which a single conductor is connected alternately to the potential electrodes in the bore hole;

Figure 3 is a schematic diagram of apparatus for simultaneously obtaining indications of resistivity at two different depths of investigation, together with indications of spontaneous potentials; and Figure 4 illustrates a modification similar to that shown in Figure 3, in which the source of current is adapted to be lowered in the bore hole.

Considering Figure 1, the investigating apparatus includes a power circuit comprising an electrode 7, adapted to be lowered in the bore hole, which is connected in series with a cable 8, a source of current 9 and a current measuring instrument 11 to a grounded point 10 at the earth's surface. Spaced a short distance from the power electrode 7 in the bore hole is a potential electrode 12' which is connected through an insulated conductor 15' to a potential measuring instrument 13', the other terminal of which is connected to a ground 14' at the earth's surface.

Located at a greater distance from the potential electrode 12' is a second potential electrode 12", which is connected through an insulated conductor 15" to a second potential measuring instrument 13", whose other terminal is connected to a ground 14" at the earth's surface.

It will be convenient for the purpose of this description to assume that the electrode 12' is located at a distance of the order of the magnitude of the diameter of the bore hole from the power electrode 7, while the electrode 12" is located at a distance 5 or 6 times the diameter of the bore hole from the power electrode 7. However, it is to be clearly understood that these dimensions, as well as any others which may appear in the following description, are given merely by way of example, since, obviously, any conventional electrode spacing may be used, depending upon the results desired.

In operation, the power electrode 7 and the potential electrodes 12' and 12" are lowered together into the bore hole, and indications of the potentials of the two potential electrodes 12' and 12" with respect to the grounds 14' and 14" respectively are obtained from the measuring instruments 13' and 13" respectively. The variations in potential of the electrode 12' are indicative of the variations in resistivity of formations located a distance approximately equal to the spacing between the power electrode 7 and the potential electrode 12', which distance is kept relatively small so that the nature of thin layers may be determined with high accuracy.

In a similar manner the potential variations of the electrode 12" provide indications of resistivity variations in formations located at a distance approximately equal to the spacing between power electrode 7 and potential electrode 12", which spacing is so chosen that very accurate indications of the resistivity of permeable strata may be readily obtained.

By employing the modification illustrated in Figure 2, one of the cables to the potential electrodes 12' and 12" may be eliminated. To this end a small automatic switch 20 is provided which may comprise, for example, a rotatable commutator 21 driven by suitable power means 22. The commutator 21 comprises an insulated segment 23 and an adjacent conductive segment 24 by means of which the potential electrodes 12' and 12" may be alternately connected to an insulated conductor 15 which is connected to a measuring device 13, the other terminal of which is connected to a ground 14 at the earth's surface.

The measuring device 13 should preferably be of the recording type, and it should be designed to have a low time constant so that its recording element, by moving alternately from one position to the other, may be able to record simultaneously on the same record strip the respective potential differences between the ground point 14 and the electrodes 12' and 12".

Where it is desired to obtain indications of the spontaneous potentials existing in the bore hole simultaneously with the indications of resistivity at two depths of investigation, the apparatus illustrated in Figure 3 may be used. In this embodiment of the invention, the electrode 7 is connected through the insulated conductor 8 to a source of alternating current 9, in series with which is provided a current measuring device 10 and a variable resistor 18. The other terminal of the source 9 is connected to an insulated conductor 16 which is wound around the upper portion of the conductor 8 and which terminates in a second power electrode 17.

The power electrode 17 is adapted to be lowered in the bore hole with the power electrode 7, and it should be spaced from the electrode 7 a distance which is great as compared with the respective distances between the three other electrodes, but which is small as compared with the total length of the conductors used. For example, the distance between the electrode 17 and the electrode 7 may be in the neighborhood of 10 or 15 meters.

The resistance of the power circuit is preferably made relatively high in order that a current of substantially constant intensity may be obtained. Some variation in the current intensity may be obtained by adjusting the variable resistor 18.

The potential electrode 12' may be located a distance approximately equal to the diameter of the bore hole from the power electrode 7, and it is connected through the insulated conductor 15' to a device 19 for measuring direct current potentials only, and a device 13' for measuring alternating current potentials only, the other terminal of the measuring device 13' being connected to the ground point 14' at the earth's surface. Inasmuch as the device 19 is responsive to direct current only, it provides indications of the spontaneous potential existing in the bore hole.

On the other hand, the measuring device 13', being responsive to alternating current only, does not measure spontaneous potentials but it does measure the alternating current potential difference between the electrode 12' and the ground point 14'. This potential circuit provides indications of spontaneous potentials together with indications of resistivity at one depth of investigation.

The second potential electrode 12" may be located at a distance equal to from four to six times the diameter of the bore hole from the power electrode 7, and it is connected through the insulated conductor 15" to a measuring device 13" which is responsive to alternating current only, its other terminal being connected to the ground point 14" at the earth's surface. Inasmuch as the instrument 13" provides indications of alternating current only, it does not give indications of spontaneous potentials but it does provide indications of variations in the potential difference between the electrode 12" and the ground 14". This potential circuit provides indications of resistivity at a second depth of investigation.

The conductor 16 is twisted around the conductor 8 for the purpose of preventing any appreciable transfer of energy from the power circuit to either of the potential conductors 15' or 15", thus reducing any possibility of spurious potential values being obtained. In addition, the electrode 17 is maintained at a relatively great distance from the potential electrodes 12' and 12", so that it has little or no influence on the potentials at these electrodes.

In operation, the two power electrodes 17 and 7 and the two potential electrodes 12' and 12"

are lowered in the bore hole, the spacing between the electrodes being maintained fixed while the survey is being made. In this fashion it is possible to obtain simultaneous indications of resistivity at two depths of investigation together with indications of spontaneous potentials.

By comparing the indications of the resistivities obtained at the two depths of investigation, it is possible to obtain very accurate information regarding the nature of the strata traversed by a bore hole. Moreover, by correlating the two sets of resistivity values with the indications of spontaneous potentials additional valuable information concerning the nature of the different formations may be gathered.

As indicated above, the value of the current flowing in the power circuit and measured by the current measuring device 11 will remain practically constant because the entire circuit resistance, which is relatively high, will not vary appreciably. However, if for any reason the current value should vary during the measurements it may be restored to its original value by adjusting the variable resistor 18.

The apparatus shown in Figure 4 is similar to that disclosed in Figure 3, the difference being that the source of current 9 is adapted to be lowered into the bore hole with the electrode system in the manner disclosed in copending application Serial No. 21,072 filed May 11, 1935 by Conrad Schlumberger.

In this modification the power electrodes 17 and 7 are connected to the source of current 9 which is located in the bore hole adjacent the power electrode 7. The potential electrodes 12' and 12" are connected to electrical measuring devices exactly as in the modification shown in Figure 3. The spacing between the electrodes 7, 17, 12' and 12" may be the same as suggested above for the corresponding electrodes in Figure 3.

The source of current 9 may be of any conventional type such as, for example, an alternator providing a sinusoidal output, or a source of direct current provided with a commutator, preferably of the rotary type, for interrupting or periodically reversing the direction of the current. Where periodically interrupted or reversed current is used, the measuring devices 13' and 13" may be adapted in the conventional manner to provide indications of potential differences of this character. In any event the current used in the power circuit should be of approximately constant magnitude regardless of its characteristics. To this end it is usually desirable to provide a current source having a high internal resistance.

An important feature of the apparatus illustrated in Figure 4 is that it reduces the number of conductors required from three as in Figure 1 or four as shown in Figure 3 to two. If desired, the number of conductors may be reduced still further by using a single conductor and a commutator device for connecting it alternately to the electrodes 12' and 12", substantially as described above in connection with Figure 2.

In practice, the nature of the formations may be deduced immediately by observing and comparing the diagrams recorded by means of the devices 13' and 13". Likewise, indications of the spontaneous potentials existing in the bore hole may be obtained from a record provided by the potential measuring device 19. By comparing these three diagrams, valuable information regarding the nature of the different formations may be readily obtained.

It will be evident that the various embodiments disclosed may be modified in various ways without departing from the scope of the invention. For example, instead of obtaining indications of resistivity at two depths of investigation it would be possible, if necessary, in accordance with the invention, to obtain indications of resistivity at three or more different depths of investigation. Where this is done, the desired information regarding the character of the strata traversed may be obtained by comparing the respective indications observed.

While several specific embodiments have been described above in detail, the invention is not intended to be in any way limited thereby, but is susceptible of numerous changes in form and detail within the scope of the appended claims.

What I claim is:

1. A device for the determination of the strata traversed by a drill hole, comprising an electrode placed inside the drill hole, means for sending an electric current between this electrode and a reference point, a second electrode placed at a slight distance from the first electrode and connected by an insulated conductor to an apparatus for measuring potential differences placed at the surface of the ground and whose other terminal is earthed, and a third electrode placed at a distance from the first electrode greater than the distance separating the first two electrodes and also connected by an insulated conductor to another apparatus for measuring the potential differences and whose other terminal is earthed.

2. A device for the determination of the formations traversed by a drill hole, comprising an electrode placed inside the drill hole and adapted to be moved inside this drill hole, means for sending an alternating electric current between this electrode and a reference point, a second electrode placed at a slight distance from the first electrode and connected by an insulated conductor to an apparatus for measuring differences of potential, responsive to alternating differences of potential only, placed at the surface of the ground and whose other terminal is earthed, a third electrode placed at a distance from the first electrode greater than the distance separating the first two electrodes and also connected by an insulated conductor to an apparatus for measuring differences of potential, responsive to alternating differences of potential only and whose other terminal is earthed, and an apparatus for measuring potential differences responsive to direct differences of potential only, mounted in series in the circuit of one of said last-named electrodes.

3. Apparatus for determining the nature of the strata traversed by a drill hole comprising means for creating an electric field in the formation, a circuit for obtaining indications of the potential difference set up by the field in the formation closely adjacent the bore hole, a second circuit for obtaining indications of the potential difference set up by said field in the formation spaced by a predetermined distance from the bore hole, and means in one of said circuits for separately obtaining indications of the spontaneous potentials existing in the formation.

4. Apparatus for determining the nature of the strata traversed by a drill hole comprising means for creating an alternating current electric field in the formation, an electrode adapted to be moved in the bore hole, a circuit for obtaining indications of the potential difference set up by said field in the formation between said electrode and a reference point, a second electrode spaced from said first electrode and movable therewith, a second circuit for obtaining indications of the potential difference set up by said field in the formation between said second electrode and a point of reference, and means in one of said circuits for separately obtaining indications of the spontaneous potentials existing in the formation.

5. Apparatus for determining the nature of the formations traversed by a drill hole comprising means for creating an electric field in the formation, an electrode adapted to be moved in the drill hole, a second electrode spaced from said first electrode and movable therewith, a potential indicating circuit grounded at one end, and means for alternately connecting the other end of said circuit electrically to said electrodes respectively, for obtaining indications of potentials set up by said field in the formation closely adjacent the drill hole, and potentials set up by said field in the formation spaced by a predetermined distance from the drill hole.

6. A device for determining the nature of the strata traversed by a bore hole comprising an electrode disposed in the bore hole, means including the electrode for creating an electric field in the strata, a plurality of potential electrodes in the bore hole, spaced from each other and from said first electrode, and means for obtaining indications of the potential differences produced by said created electric field between each of said respective potential electrodes and a reference point.

7. A device for determining the nature of the strata traversed by a bore hole comprising a source of voltage disposed in the bore hole, a pair of electrodes connected to said source for creating an electric field in the strata, a plurality of potential electrodes in the bore hole, spaced from each other and from the respective electrodes comprising said pair, and means for obtaining indications of the potential differences produced by said created electric field between each of said respective potential electrodes and a reference point.

8. A device for determining the nature of the strata traversed by a bore hole, comprising a source of voltage disposed in the bore hole, a pair of electrodes connected to said source for creating an electric field in the strata, a plurality of potential electrodes, spaced from each other and from the respective electrodes comprising said pair, means for obtaining indications of potential differences produced by said created field between each of said respective potential electrodes and a reference point, and means for obtaining indications of potential differences between at least one of said potential electrodes and a reference point, produced by spontaneous potentials existing in the bore hole.

HENRI GEORGES DOLL.